US009223033B2

(12) United States Patent
Perna (10) Patent No.: US 9,223,033 B2
(45) Date of Patent: Dec. 29, 2015

(54) SCINTILLATOR ARRAY AND METHODS OF FORMING A SCINTILLATOR ARRAY AND A RADIATION DETECTOR

(71) Applicant: Saint-Gobain Ceramics & Plastics, Inc., Worcester, MA (US)

(72) Inventor: Louis Perna, Elyria, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 14/631,274

(22) Filed: Feb. 25, 2015

(65) Prior Publication Data

US 2015/0241570 A1 Aug. 27, 2015

Related U.S. Application Data

(60) Provisional application No. 61/944,951, filed on Feb. 26, 2014.

(51) Int. Cl.
*G01T 1/20* (2006.01)
(52) U.S. Cl.
CPC ............... *G01T 1/2002* (2013.01); *G01T 1/20* (2013.01)
(58) Field of Classification Search
CPC .................................. G01T 1/20; G01T 1/2002
See application file for complete search history.

(56) References Cited

U.S. PATENT DOCUMENTS

| 8,426,823 | B2 | 4/2013 | Schulz et al. |
| 8,598,532 | B2 | 12/2013 | Cooke et al. |
| 2004/0042585 | A1* | 3/2004 | Nagarkar et al. ............ 378/98.8 |
| 2009/0134334 | A1* | 5/2009 | Nelson ...................... 250/361 R |
| 2009/0134335 | A1 | 5/2009 | Tsuda et al. |
| 2010/0148074 | A1 | 6/2010 | Menge et al. |
| 2012/0199748 | A1 | 8/2012 | Cooke et al. |
| 2013/0153776 | A1 | 6/2013 | Wieczorek et al. |
| 2013/0299710 | A1 | 11/2013 | Uchida et al. |
| 2013/0306876 | A1 | 11/2013 | Uchida |

OTHER PUBLICATIONS

International Search Report and Written Opinion for PCT Application No. PCT/US2015/017501, dated Jun. 8, 2015, 15 pages.

* cited by examiner

*Primary Examiner* — Mark R Gaworecki
(74) *Attorney, Agent, or Firm* — Abel Law Group, LLP; Robert N Young (57) ABSTRACT

Embodiments of the present disclosure relate to a scintillator array including a reflector disposed between the scintillator pixels, and methods of forming the scintillator array and radiation detector. In an embodiment, the reflector can be used in the scintillator array without an adhesive. In another embodiment, the reflector can be disposed in a zigzag pattern between the scintillator pixels.

20 Claims, 4 Drawing Sheets

SCINTILLATOR ARRAY AND METHODS OF FORMING A SCINTILLATOR ARRAY AND A RADIATION DETECTOR

CROSS-REFERENCE TO RELATED APPLICATION

This application claims priority under 35 U.S.C. §119(e) to U.S. Provisional Patent Application No. 61/944,951 entitled "Scintillator Array And Methods Of Forming A Scintillator Array And A Radiation Detector," by Louis Perna, filed Feb. 26, 2014, which is assigned to the current assignee hereof and incorporated herein by reference in its entirety.

FIELD OF THE DISCLOSURE

The present disclosure is directed to a scintillator array and methods of forming the scintillator array and a radiation detector.

BACKGROUND

Reflectors can be used in scintillator arrays to increase light output. Reflectors can also be used to reduce cross-talk between scintillator pixels in an array. Liquid adhesives can be used to attach reflectors to scintillator pixels. Scintillator pixels in an array can also be wrapped up individually by reflectors. However, further improvement of scintillator arrays, radiation sensors, and use of reflectors is desired.

BRIEF DESCRIPTION OF THE DRAWINGS

Embodiments are illustrated by way of example and are not limited by the accompanying figures.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "photosensor surface," with respect to a scintillator pixel, is intended to mean a surface coupled to or intended to be coupled to a photosensor. The term "side surface," with respect to a scintillator pixel, is intended to mean a surface adjacent to the photosensor surface. The term "outer side surface", with respect to a scintillator pixel, is intended to mean a side surface that is facing away from the center of the array.

The term "rare earth" or "rare earth element" is intended to mean Y, Sc, and the Lanthanides (La to Lu) in the Periodic Table of the Elements. In chemical formulas, a rare earth element is represented by "RE.".

The terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A scintillator array can be fabricated such that a reflector can be used between scintillator pixels. In an embodiment, the reflector can be placed in a zigzag pattern around the scintillator pixels. In another embodiment, the reflector can extend continuously between at least some of the scintillator pixels in different rows and in different columns. The arrangement of the reflector can allow optical separation between the adjacent scintillator pixels. In a particular embodiment, the reflector can be disposed directly in contact with the scintillator pixels without applying an intermediate layer, such as an adhesive. Liquid adhesive may cause a particular reflector to discolor and lose reflectivity. Avoiding using an adhesive to attach the reflector to the scintillator pixels can improve reflectivity of the reflector, which in turn can increase light output of the scintillator array.

In a further embodiment, a housing including square internal corners can be used to secure the scintillator array. The square corners of the housing can apply a sufficient pressure to hold the scintillator array and maintain more uniform pitch along x-axis and y-axis directions of the scintillator array. The pressure applied to the array may not adversely affect the reflector, and can help to stabilize the structure of the scintillator array.

Figure 1:
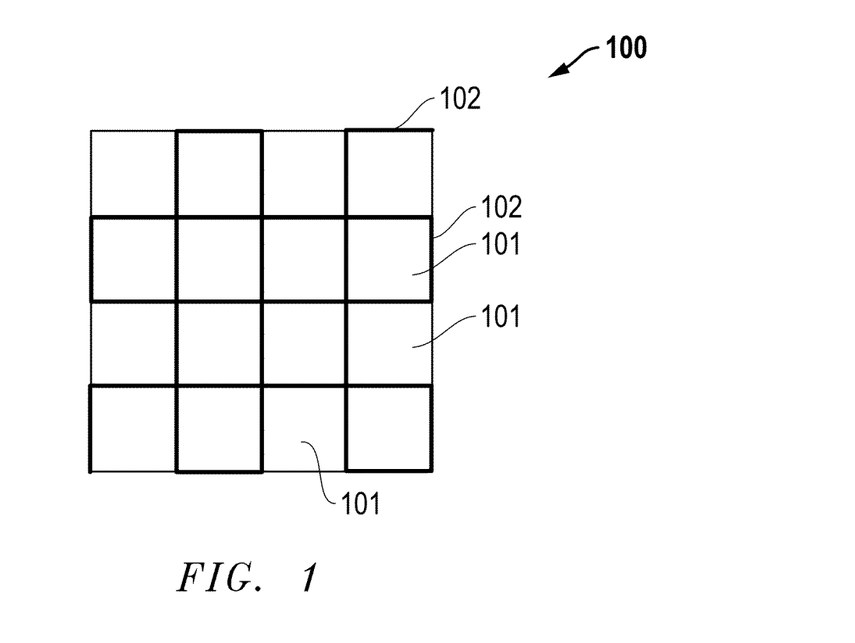
FIG. 1 includes an illustration of an array of scintillator pixels including a reflector disposed between the scintillator pixels in accordance with an embodiment.

FIG. 1 illustrates a top view of a scintillator array 100 in accordance with an embodiment. The scintillator array 100 can include a plurality of scintillator pixels 101 arranged in rows and columns. Each of the scintillator pixels can include substantially the same scintillating material. The scintillating material can include inorganic materials, such as a rare earth or other metal halide; a rare earth sulfide, oxysulfide, germinate, silicate, or aluminum garnet; $CdWO_4$, $CaWO_4$, ZnS, ZnO, ZnCdS, another suitable scintillator material, or the like. The scintillator material can be sensitive to particular types of radiation, for example, X-rays, gamma rays, neutrons, etc., and the scintillator arrays can be used accordingly in conjunction with photosensors in applications of detecting X-ray, gamma ray, neutrons, or other radiation. The photosensors can include a photomultiplier tube, a silicon photomultiplier tube, a hybrid photosensor, a photodiode, a position sensitive photosensor such as a position sensitive photomultiplier tube, and the like.

Each of the scintillator pixels within the scintillator array can include a front surface and an opposing back surface. The front surface can be the photosensor surface that faces or, after fabrication, will face a photosensor. Accordingly, the scintillator array can also include a front surface and an opposing back surface. The front surface of the scintillator array can be coupled to the photosensor. Each of the scintillator pixels can also include side surfaces extending between the photosensor surface and the back surface. The scintillator array can further include a perimeter. Each of the scintillator pixels along the perimeter of the scintillator array can have an outer side surface facing the outside of the scintillator array (away from the center of the scintillator array).

The scintillator array 100 can include a 2-D array. Examples of a 2-D array can have a size of at least 2×2 pixels, such as 3×3 pixels, 4×4 pixels, 8×8 pixels, 16×16 pixels, 32×32 pixels, 64×64 pixels, or the like. In another embodiment, the scintillator array may have a dissimilar number of scintillator pixels along the rows and columns, for example 2×8 pixels, 8×16 pixels, or the like. After reading this specification, a skilled artisan will understand that the size of the scintillator array can vary depending on a particular application of the scintillator array and can be larger than 64×64 pixels. Each scintillator pixel can have a width, a depth, and a length. Further, each scintillator pixel can be substantially identically sized. In an embodiment, the width and the length can be at least about 1.0 mm (0.04 inches). For example, the width and the length can be at least about 2.0 mm (0.08 inches), which may allow easy handling of the scintillator pixels. In another embodiment, the width and the length may be no greater than about 15.0 mm (0.6 inches), such as not greater than about 9 mm (0.35 inches), as resolution of the scintillator array may decrease significantly when the width or length of the scintillator pixel becomes larger than 15.0 mm. In a particular embodiment, the width and the length of each scintillator pixel can be substantially the same. For example the width and the length of the scintillator pixel may be in a range of between at least about 1.0 mm to not greater than about 15.0 mm, or in a range of between at least about 2.0 mm to not greater than about 9.0 mm. In yet another aspect, the depth of each scintillator pixel can be at least about 12.7 mm (0.5 inches). Further, the depth of each scintillator pixel can be at least about 25.4 mm (1.0 inches), such as at least about 50.8 mm (2.0 inches), or at least about 101.6 mm (4.0 inches). In still another aspect, the depth of each scintillator pixel 204 is not greater than about 254.0 mm (10.0 inches). For example, the length of the scintillator pixel may be in a range of between at least about 12.7 mm to not greater than about 254 mm. After reading this specification, a skilled artisan will understand that the width, the length, and the depth of the scintillator pixel can be within any of the minimum and maximum values disclosed herein.

In an embodiment, the scintillator array provided herein can be used in a radiation sensor system. The radiation sensor system can be a medical imaging apparatus, a well logging apparatus, a security inspection apparatus, nuclear physics applications, or the like. In an embodiment, the radiation detection system can be used for gamma ray analysis, such as a Single Photon Emission Computed Tomography (SPECT) or Positron Emission Tomography (PET) analysis.

The scintillator array 100 can include a reflector 102 disposed between the scintillator pixels 101. In an embodiment, the reflector 102 can include a diffuse reflective material. A diffuse reflective material can include a polyester, a fluoropolymer, or a combination thereof. The fluoropolymer can include polytetrafluoroethylene (PTFE). In a particular embodiment, the reflector can include a PTFE tape. In another embodiment, the reflector 102 can include a specular reflective material. Examples of a specular reflective material can include aluminum, such as aluminum foil, or aluminized Mylar. The specular reflective material can also include silver, nickel, chromium, or the like. In another embodiment, the reflector 102 can include a layer of diffuse reflective material and a layer of a specular reflective material. In yet another embodiment, the reflector can include a specular reflective material sandwiched between two layers of the diffuse reflective materials. In a particular embodiment, the reflector can include a layer of aluminum foil disposed between two layers of a PTFE tape.

As depicted in FIG. 1, the reflector 102 disposed between the scintillator pixels forms a zigzag pattern. In an embodiment, the reflector 102 can be placed adjacent to the side surfaces of the scintillator pixels without applying an intermediate layer, such as an adhesive, such that the reflector 102 can be in direct contact with the side surfaces of the scintillator pixels. In a further embodiment, the reflector 102 can be tightly attached to the side surfaces of the scintillator pixels so that space between the reflector and a side surface of a scintillator pixel may not be greater than about 10 microns. For example, the space between the reflector and a side surface of a scintillator pixel may not be greater than about 5 microns, such as not greater than about 3 microns. In a particular embodiment, a PTFE tape can be tightly attached to the side surfaces of the scintillator array.

In another embodiment, the reflector 102 can be disposed to at least partially cover the side surfaces of the scintillator pixels. In yet another embodiment, the outer side surface of every other scintillator pixel along the perimeter of the scintillator array is covered by the reflector 102. In a particular embodiment, the reflector 102 can be disposed between the scintillator pixels to optically isolate adjacent scintillator pixels. In a further embodiment, all of the side surfaces of the scintillator pixels spaced apart from the perimeter of the scintillator array can be covered by the reflector. In an even further embodiment, a scintillator pixel at a corner of the scintillator array may have only two side surfaces in contact with the reflector 102.

In still another embodiment, the reflector 102 can extend continuously between at least some of the scintillator pixels in different rows and in different columns. For example, the reflector can extend continuously between at least the scintillator pixels in two different rows and in two different columns. In another embodiment, the reflector can extend continuously between at least the scintillator pixels in two different rows and in three different columns. In yet another embodiment, the reflector can extend continuously between at least the scintillator pixels in four different rows and in four different columns. In a further embodiment, the reflector can extend continuously between the scintillator pixels throughout the scintillator array.

In an embodiment, the scintillator array 100 can include one or more reflectors disposed adjacent to the back surface of the scintillator array and the outer side surfaces along the perimeter of the scintillator pixels. In an embodiment, the reflector can be in direct contact with the back surface of the scintillator array or at least some of the outer side surfaces along the perimeter of the scintillating pixels. The reflectors can include a diffuse material, such as a fluoropolymer or a polyester, a specular reflective material, such as aluminum foil, or a combination thereof.

Figure 2:
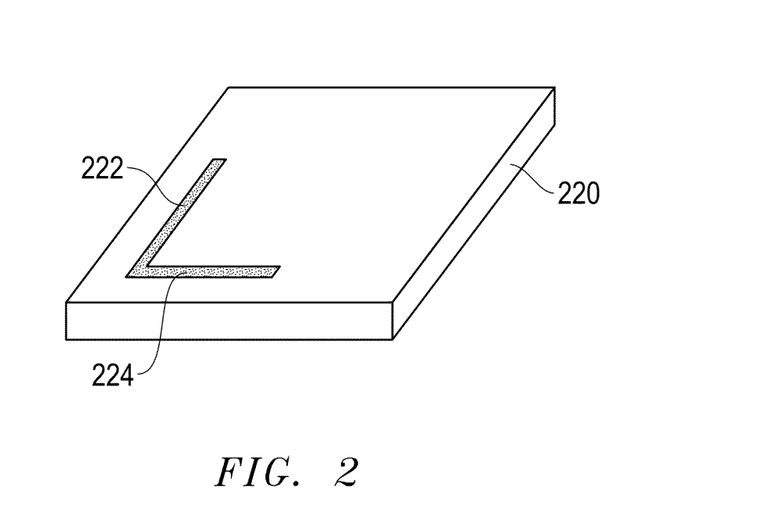
FIGS. 2-8 illustrate exemplary scintillator arrays during a fabrication process in accordance with embodiments disclosed herein.
Figure 3:
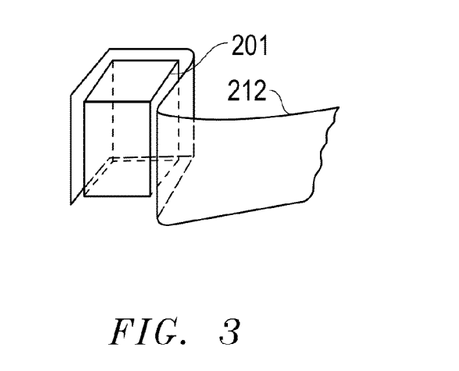
Figure 4:
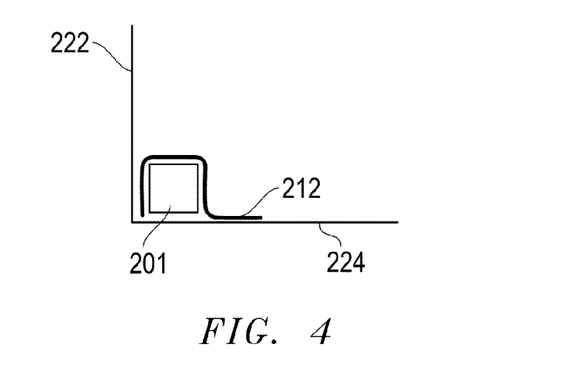

A method of making a scintillator array is described in more detail with respect to illustrations in FIGS. 2 to 8. Referring to FIG. 2, a fixture 220 as illustrated can be used to provide alignment for assembling the scintillator pixels in the scintillator array. The fixture 220 can include an arm 222 and an arm 224 to provide the alignment. In an embodiment, the scintillator pixels can be aligned against the arms 222 and 224. After reading this specification, a skilled artisan will understand that tools other than the fixture 220 can be used to align the scintillator pixels to form the scintillator array. Although the scintillator pixels, the reflector, and the arms 222 and 224 are illustrated separate from each other, there may not be gaps between the scintillator pixels and the reflector. As depicted in FIG. 3, a reflector 212 can be applied adjacent to any three side surfaces of the scintillator pixel 201. For example, the reflector 212 can be tightly attached to the side surfaces 2012, 2014, and 2016 without using any adhesive between the reflector 212 and the scintillator pixel 201. Alternatively, the reflector 212 can be wrapped around all of the side surfaces of the scintillator pixel 201. Referring to FIG. 4, the scintillator pixel 201 can be placed against a corner formed by the arm 222 and 224 of the fixture 220 with the reflector 212 disposed as disclosed herein.

Figure 5:
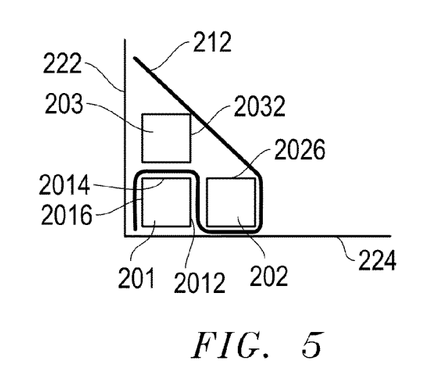

Referring to FIG. 5, scintillator pixels 202 and 203 can be placed on the fixture along a diagonal line. The scintillator pixel 202 can be placed adjacent to the side surface 2012 of the pixel 201 and in alignment with the pixel 201. The reflector 212 can separate the pixel 202 from the side surface 2012 of the pixel 201. The scintillator pixel 203 can be placed adjacent to the side surface 2016 of the pixel 201 and in alignment with the pixel 201. The side surface 2016 of the pixel 201 can be separated from the pixel 203 by the reflector 212. The reflector 212 can be placed around the outer surfaces of the scintillator pixel 202 and brought adjacent to the scintillator pixel 203 along a diagonal line. In an embodiment, a tool can be used to help to place the reflector into corners formed by side surfaces of different scintillator pixels, such as the corner formed by the side surface 2032 of the pixel 203 and the side surface 2026 of the pixel 202. The tool can be rounded or relatively soft so as to not adversely affect (for example, tear) the reflector, and at the same time transmit pressure onto the reflector to place the reflector into the corner. Examples of the tool include a paint brush, a sponge, an elastomeric block, or the like. In a further embodiment, the reflector 212 can be directly attached to the side surfaces of the scintillator pixels 202 and 203.

Figure 6:
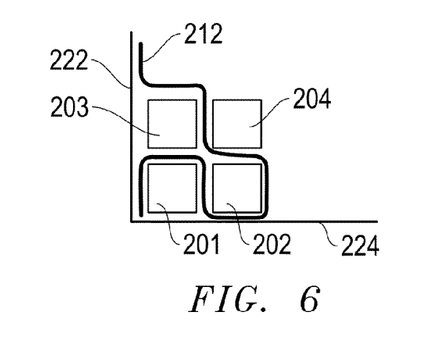
Figure 7:
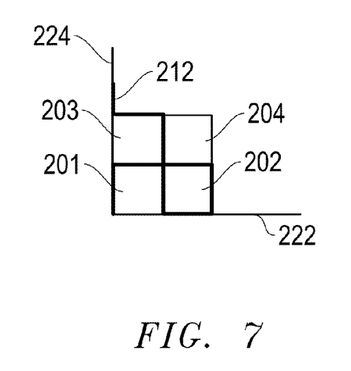

Referring to FIG. 6, a scintillator pixel 204 can be placed along another diagonal line and adjacent to the scintillator pixels 202 and 203. The diagonal line passing through the scintillator pixel 204 is substantially parallel to the diagonal line extending through the scintillator pixels 202 and 203. In an embodiment, the scintillator pixel 204 can be gently pushed into the space between the scintillator pixels 202 and 203. The reflector 212 can be disposed along the adjacent side surfaces of the scintillator pixels 202, 203, and 204 and can be directly attached to those side surfaces. As illustrated, the scintillator pixel 204 is separated from the scintillator pixels 202 and 203 by the reflector 212. At this point of the fabrication process, the scintillator array including 2×2 pixels can be formed, as illustrated in FIG. 7.

Figure 8:
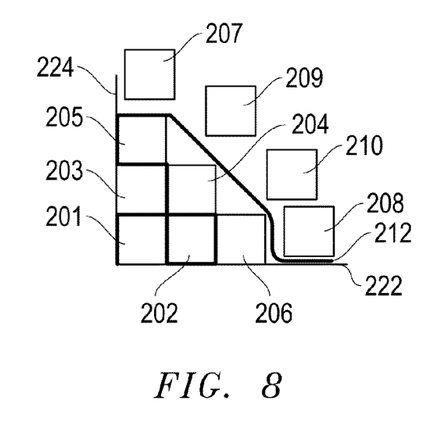

Referring to FIG. 8, if a scintillator array including more than 2×2 pixels is desired, scintillator pixels 205 and 206 can be disposed in the fixture 220. The scintillator pixel 205 can be disposed in alignment with the scintillator pixels 201 and 203. The scintillator pixel 206 can be disposed in alignment with the scintillator pixels 201 and 202. The reflector can be placed around the outer side surfaces of the scintillator pixel 205, and along another diagonal line that is parallel to the diagonal line in which scintillator pixels 204, 205, and 206 are disposed. In an embodiment, the reflector 212 can be tightly attached to the outer side surface of the scintillator pixel 205. Scintillator pixels 207, 208, 209, and 210 can be placed in the scintillator array along yet another diagonal line that is substantially parallel to the other previously described diagonal lines. The scintillator pixel 207 can be placed in alignment with the scintillator pixels 201, 203, and 205. The scintillator pixels 209 and 210 can be gently pushed into the spaces between the scintillator pixel 204 and 205 and between the scintillator pixel 204 and 206, respectively. The scintillator pixel 208 can be placed in alignment with the scintillator pixels 201, 202, and 206. The reflector 212 can separate the adjacent side surfaces between the scintillator pixels 205 and 207. The reflector 212 further separates the scintillator pixel 209 from each of the scintillator pixels 204 and 205. The pixel 210 is isolated from each of the pixels 204 and 206 by the reflector 212 that is also disposed between the adjacent side surfaces of the scintillator pixels 206 and 208. The process similar to what is described with respect to FIGS. 5 to 7 can be repeated to form a scintillator array including a desired number of pixels. The array can include the reflector 212 tightly attached to the side surfaces of the scintillator pixels. In an embodiment, forces can be applied to the outer side surfaces along the perimeter of the scintillator array to gently compress the scintillator array against the arms 222 and 224 to strengthen the attachment between the reflector 212 and the side surfaces of the scintillator pixels.

The reflector 212 can include a specular reflective material or a diffuse reflective material. In another embodiment, the reflector 212 can include multiple layers of reflective materials, such as a layer of a specular material sandwiched between two layers of a diffuse material. In accordance with this embodiment, a preformed reflector including multiple layers of reflective materials can be disposed between the scintillator pixels. Alternatively, the multiple layers of reflective materials can be used as a single unit to wrap around the scintillator pixels as described herein. For example, each layer of the reflective materials can be placed around a first scintillator pixel separately, such as the scintillator pixel 201, and then is used between scintillator pixels as previously described.

In an embodiment, after a scintillator array of a desired size is formed, a reflector can be applied to the back surface of the scintillator array. The reflector can be any of the reflectors as previously described with respect to the reflector 212. The reflector may be stiff or otherwise not easily bent. In a particular embodiment, a reflector including a diffuse material, such as a fluoropolymer, can be attached to the back surface of the scintillator array. In a further embodiment, another reflector including a specular reflective material or a diffuse reflective material can be applied to the reflector that is attached to the back surface of the array. In another embodiment, one or more reflectors can also be disposed along the outer side surfaces of the scintillator pixels along the perimeter of the array without using an adhesive. For example, a reflector including a fluoropolymer can be applied to the outer side surfaces of the scintillator pixels along the scintillator array perimeter, and an additional reflector including a polyester or metal foil can be applied to the reflector including a fluoropolymer.

Figure 9:
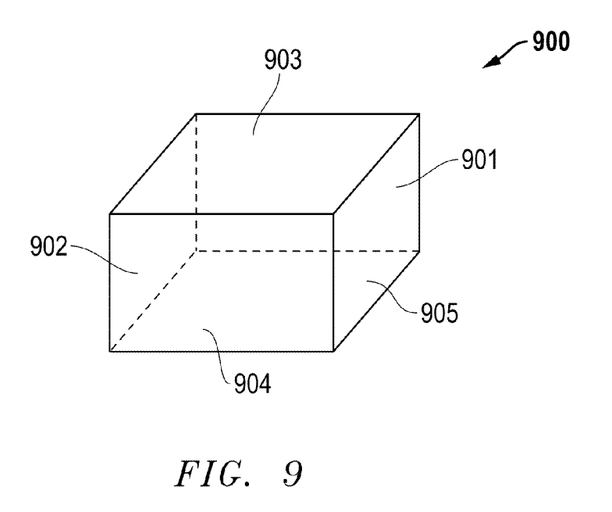
FIG. 9 includes an illustration of a scintillator housing in accordance with an embodiment.

In an embodiment, the scintillator array provided herein can include a housing. In accordance with the embodiment, after the scintillator array is assembled, the scintillator array can be placed in the housing. Referring to FIG. 9, the housing 900 can include a bottom surface 905 intersecting the walls 901, 902, 903, and 904. The walls 901, 902, 903, and 904 can be perpendicular to the bottom surface 905, and extending from the bottom surface 905. The opposing walls 902 and 901 can be parallel, and the opposing walls 903 and 904 can be parallel. In an embodiment, the back surface of the scintillator array can be placed adjacent to the bottom surface 905 of the housing 900. In another embodiment, the housing can have a depth greater than the depth of the scintillator pixels within the scintillator array. For example, the housing can further hold a photosensor coupled to the scintillator array. In a further embodiment, the housing can have grooves on two opposing outer surfaces of the walls of the housing. Tie straps can fit in the grooves to provide additional support to retain the photosensor and the scintillator array together.

In another embodiment, the scintillator array, including the housing, can be part of a larger array. The larger array can include multiple scintillator arrays each including a housing similar to the housing as described herein. In such an arrangement, each scintillator array can be a sub-array of the larger array. Tie straps may also be applied to the larger housing to retain the housings of the scintillator arrays together.

As illustrated, the housing 900 can also include internal corners formed by intersecting walls, and the walls intersecting the bottom surface. In a particular embodiment, the internal corners are sharp and square. For example, each internal corner may have a radius of not greater than about 1.5 mm, not greater than about 1 mm, not greater than about 0.8 mm, or not greater than about 0.6 mm. In another embodiment, the internal corner radius may be not greater than about the width of the scintillator pixel, such as not greater than about ½ of the width of the scintillator pixel, or not greater than about ¼ of the width of the scintillator pixel. The housing including sharp, square internal corners can apply sufficient pressure to the scintillator array assembly and provide stability to the structure without adversely affecting the reflectors.

In another embodiment, the housing can include a carbon fiber, titanium, stainless steel, plastic, or aluminum. In a particular embodiment, the housing includes a carbon fiber, such as a low density carbon fiber.

In yet another embodiment, a photosensor can be coupled to the front surface of the scintillator array. An optically transparent coupling material can be used to couple the photosensor to the scintillator array. In an embodiment, a material, such as a polymer, can be applied to the photosensor and cured to form an optically transparent coupling material before coupling the photosensor to the front surface. In a particular embodiment, the material can include an elastomer, such as silicone rubber.

In another embodiment, the coupling material can have a thickness of at least about 1 mm. For example, the thickness can be at least about 1.0 mm, at least about 1.5 mm, or at least about 2 mm. In another embodiment, the thickness of the coupling material may be not greater than about 5 mm, not greater than about 4 mm, or not greater than about 3 mm. In another embodiment, the thickness of the cured coupling material can be within a range of about 1 mm to about 5 mm, within a range of between about 1.5 mm to about 4 mm, or within a range of about 2 mm to about 3 mm. When coupling the photosensor to the scintillator array, the coupling material can be in direct contact with the front surfaces of the scintillator pixels of the array. The coupling material can also be in direct contact with the reflector disposed between the scintillator pixels. In a particular embodiment, the coupling material can be non-wetting to the reflector disposed between the scintillator pixels. More particularly, the coupling material may or may not be tacky, and when the coupling material includes a curable material, such material is sufficiently cured so that substantially no liquid adhesive from the curable material contacts the reflector, the scintillator pixels, or any combination thereof.

In an embodiment, the photosensor can be coupled to the scintillator array secured in the housing. The photosensor attached to the coupling material can be gently pressed until the coupling material contacts the photosensor surfaces of the scintillator pixels within the array.

Figure 10:
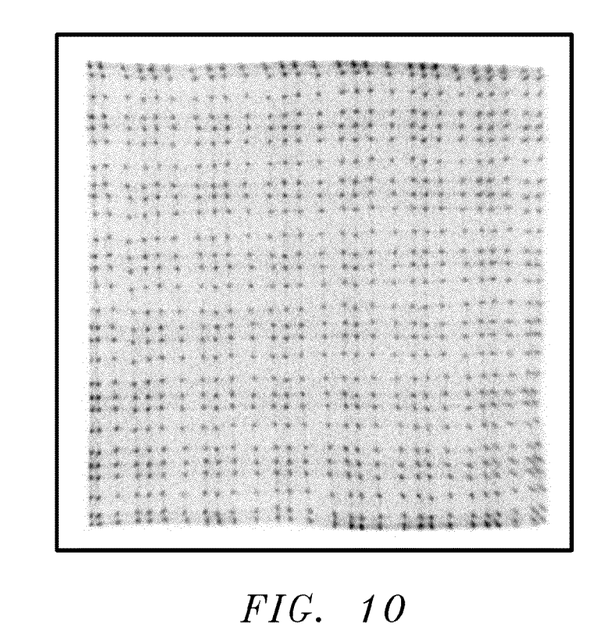
FIG. 10 includes an image generated by a scintillator array disclosed herein.
Figure 11:
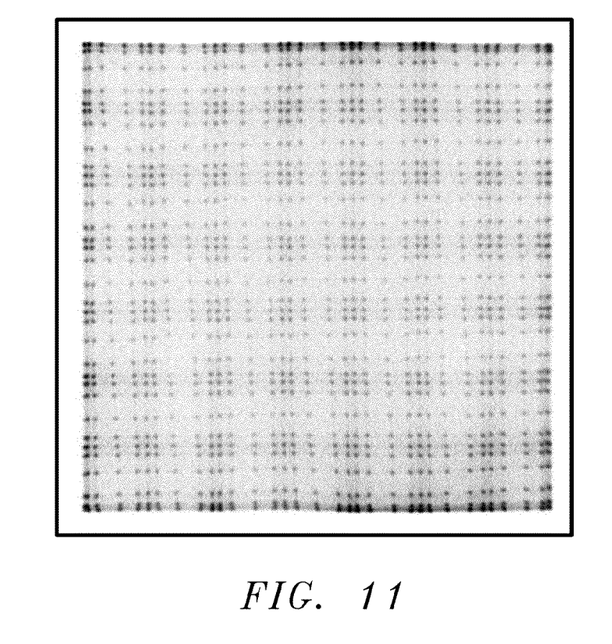
FIG. 11 provides an image generated by a scintillator array fabricated with adhesives.

In still another embodiment, the scintillator array disclosed herein can have better light output when compared to a scintillator array having substantially the same scintillator pixels but using an adhesive to attach the reflector to the scintillator pixels. FIG. 10 illustrates an image generated by the scintillator array of embodiments disclosed herein when coupled to a position sensitive photomultiplier tube. FIG. 11 provides the image produced by the scintillator array fabricated with the adhesive and coupled to a substantially same position sensitive photomultiplier tube. In a further embodiment, the light output of the scintillator array disclosed herein can be at least about 30% brighter than that of the scintillator array fabricated with the adhesive, such as at least about 40% brighter, at least about 50% brighter, or at least about 60% brighter.

The embodiments disclosed herein allow formation of a scintillator array without using an adhesive. A conventional array can use a liquid adhesive, such as epoxy or silicone, can be used to attach reflectors to scintillator pixels. However, the process of applying the adhesive to all four sides of the scintillator pixels increases manufacturing complexity, and detachment of the adhered reflectors may cause reduction in light output. Furthermore, the adhesive may adversely affect reflectivity of certain reflectors, such as a PTFE tape, because PTFE can discolor after contacting the adhesives, and the discoloration can cause loss of reflectivity over time. The fabrication process disclosed herein provides a scintillator array with enhanced light output and obviates the need for an adhesive.

The coupling material disclosed herein can be non-wetting and can further enhance performance of PTFE reflector. The coupling material disclosed herein provides sufficient thickness and tackiness to optically couple the photosensor to the scintillator pixels within the scintillator array, which helps to increase the light output of the scintillator array. The sharp, square inside corners of the housing can apply sufficient pressure to stabilize the scintillator array structure and provide a tightly packed scintillator array with improved performance that may not be realized by the housing used in the art because of corner rounding of those housing.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below. Embodiments may be in accordance with any one or more of the items as listed below.

Item 1. A scintillator array, comprising: a plurality of scintillator pixels; and a first reflector, wherein the first reflector is disposed between the scintillator pixels in a zigzag pattern.

Item 2. A scintillator array, comprising: a plurality of scintillator pixels arranged in rows and columns; and a first reflector, wherein the first reflector extends continuously between at least some of the scintillator pixels in different columns and in different rows.

Item 3. A scintillator array, comprising: a plurality of scintillator pixels arranged in rows and columns; and a first reflector disposed between the scintillator pixels, wherein each of the scintillator pixels along a perimeter of the array has an outer side surface, and wherein every other outer side surface along the perimeter of the array is covered by first the reflector.

Item 4. A scintillator array, comprising: a plurality of scintillator pixels arranged in columns and rows; a first reflector disposed between the scintillator pixels without an adhesive; and a housing comprising internal square corners and configured to secure the scintillator pixels and the first reflector.

Item 5. A method of forming a radiation detector, comprising: arranging a plurality of scintillator pixels to form a scintillator array; disposing a first reflector between the scintillator pixels; applying a material onto a photosensor and curing the material to form a non wetting optically transparent coupling material, wherein the material includes a polymer; and coupling the photosensor to the scintillator array through the optically transparent coupling material.

Item 6. A method of forming a scintillator array, comprising placing a first set of scintillator pixels in a fixture along a first diagonal line; disposing a first reflector along side surfaces of the first set of the scintillator pixels; and placing a second set of scintillator pixels in the fixture along a second diagonal line after disposing the first reflector, wherein the first reflector is disposed between and optically isolate the first set of scintillator pixels from the second set of the scintillator pixels.

Item 7. The method of item 5, wherein arranging the plurality of scintillator pixels comprises placing the scintillator pixels along a diagonal line in a fixture.

Item 8. The method of item 6 or 7, wherein disposing the first reflector between the scintillator pixels comprises placing the first reflector along the diagonal line and adjacent to the scintillator pixels.

Item 9. The method of any one of items 5 to 8, wherein disposing the first reflector comprises, along a perimeter of the scintillator array, placing the first reflector around an outer side surface of every other scintillator pixel.

Item 10. The method of any one of items 5 to 9, further comprising securing the scintillator array in a housing.

Item 11. The scintillator array or the method of any one of items 2 to 10, wherein the first reflector is disposed between the scintillator pixels in a zigzag pattern.

Item 12. The scintillator array or the method of item 1 or 11, wherein the first reflector is disposed along side surfaces of the scintillator pixels to form the zigzag pattern.

Item 13. The scintillator array or the method of any one of the preceding items, wherein the first reflector is tightly attached to the side surfaces of the scintillator pixels.

Item 14. The scintillator array or the method of any one of the preceding items, wherein the scintillator pixels are arranged in at least 2 columns and at least 3 rows.

Item 15. The scintillator array or the method of any one of items 1, and 3 to 14, wherein the first reflector extends continuously between at least some of the scintillator pixels in different rows and in different columns.

Item 16. The scintillator array or the method of any one of items 1 to 15, wherein the first reflector comprises a diffuse reflective material.

Item 17. The scintillator array or the method of any one of the preceding items, wherein the first reflector includes a fluoropolymer or a polyester.

Item 18. The scintillator array or the method of any one of the preceding items, wherein the first reflector includes PTFE.

Item 19. The scintillator array or the method of any one of items 1 to 15, wherein the first reflector comprises a specular reflective material.

Item 20. The scintillator array or the method of any one of items 1 to 15, wherein the first reflector comprises a diffuse reflective material and a specular reflective material.

Item 21. The scintillator array or the method of any one of items 1 to 15, wherein the first reflector comprises a first layer of a first diffuse reflective material, a second layer of a specular reflective material and a third layer of a second diffuse material, wherein the second layer is disposed between the first layer and the third layer.

Item 22. The scintillator array or the method of any one of items 1 to 3, wherein the scintillator array comprises a housing including internal square corners and configured to secure the scintillator array and the first reflector.

Item 23. The scintillator array or the method of any one of items 4, 10 and 19, wherein the housing includes aluminum, stainless still, or a carbon fiber.

Item 24. The scintillator array or the method of any one of items 4, 7, 18, and 19, wherein the housing comprises a low density carbon fiber.

Item 25. The method of item 5, wherein the polymer includes an elastomer.

Item 26. The method of item 5, wherein the polymer includes silicone rubber.

Item 27. The method of item 5, 25, or 26, wherein the photosensor comprises an array of photomultiplier tubesensors.

Item 28. The scintillator array or the method of any one of the preceding items, wherein the scintillator array comprises a front surface, a back surface, and outer side surface along a perimeter of the scintillator array and extending between the front surface and the back surface, and wherein the back surface and the outer side surfaces of the scintillator array are covered by a second reflector.

Item 29. The scintillator array or the method of item 28, wherein the second reflector comprises a diffuse reflector.

Item 30. The scintillator array or the method of item 28 or 29, wherein the second reflector comprises a fluoropolymer or a polyester.

Item 31. The scintillator array or the method of any one of items 28 to 30, wherein the second reflector comprises PTFE.

Item 32. The scintillator array or the method of any one of items 28 to 31, wherein the back surface and the outer side surfaces are further covered by a third reflector.

Item 33. The scintillator array or the method of item 32, wherein the third reflector comprises a diffuse reflector including a polyester.

Item 34. The scintillator array or the method of any one of the preceding items, wherein the first reflector is configured to optically separate each and every adjacent scintillator pixels.

Item 35. The scintillator array or the method of any one of the preceding items, wherein the scintillator array comprises at least 2×2 pixels.

Item 36. The scintillator array or the method of any one of the preceding items, wherein the scintillator array comprises at least 6×6 pixels.

Item 37. The scintillator array or the method of any one of the preceding items, wherein the scintillator array comprises at least 8×8 pixels.

Item 38. The scintillator array or the method of any one of the preceding items, further comprising a specular reflector adjacent to a back surface of the scintillator array.

Item 39. A radiation sensor comprising a plurality of the scintillator arrays, wherein each scintillator array within the plurality of scintillator array is the scintillator array of any one of items 1 to 4, 11 to 24, and 28 to 38.

Item 40. A radiation sensor comprising a plurality of the scintillator array made by the method of any one of items 5 to 39.

Item 41. The radiation sensor of item 39 or 40, further comprising a housing, wherein the plurality of scintillator arrays are secured in the housing.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the items.

What is claimed is:

1. A scintillator array, comprising:
   a plurality of scintillator pixels; and
   a reflector,
   wherein the reflector is in form of a tape and disposed between the scintillator pixels in a zigzag pattern.

2. The scintillator array of claim 1, wherein the reflector comprises a diffuse reflective material.

3. The scintillator array of claim 1, wherein the reflector extends continuously between at least some of the scintillator pixels in different columns and in different rows.

4. The scintillator array of claim 1, wherein the reflector comprises a fluoropolymer or a polyester.

5. The scintillator array of claim 4, wherein the reflector includes PTFE.

6. The scintillator array of claim 1, wherein the reflector comprises a specular reflective material.

7. The scintillator array of claim 1, wherein the reflector comprises a diffuse reflective material and a specular reflective material.

8. The scintillator array of claim 1, wherein the scintillator array comprises a housing including internal square corners and configured to secure the scintillator array and the reflector.

9. The scintillator array of claim 8, wherein the housing includes aluminum, stainless steel, or a carbon fiber.

10. The scintillator array of claim 9, wherein the housing comprises a low density carbon fiber.

11. A scintillator array, comprising:
    a plurality of scintillator pixels arranged in rows and columns; and
    a reflector,
    wherein:
       the reflector extends continuously between at least some of the scintillator pixels in different columns and in different rows; and
       each of the scintillator pixels along a perimeter of the array has an outer side surface, wherein every other outer side surface along the perimeter of the array is covered by the reflector.

12. The scintillator array of claim 11, wherein the reflector is disposed between the scintillator pixels in a zigzag pattern.

13. The scintillator array of claim 11, wherein the scintillator array comprises a housing including internal square corners and configured to secure the scintillator array and the reflector.

14. The scintillator array of claim 11, wherein the reflector comprises a diffuse reflective material.

15. A method of forming a scintillator array, comprising:
    placing a first set of scintillator pixels in a fixture along a first diagonal line;
    disposing a reflector along side surfaces of the first set of scintillator pixels; and
    placing a second set of scintillator pixels in the fixture along a second diagonal line after disposing the first reflector, wherein the first reflector is disposed between and optically isolate the first set of scintillator pixels from the second set of scintillator pixels.

16. The method of claim 15, wherein disposing the reflector between the scintillator pixels comprises placing the reflector along the diagonal line and adjacent to the scintillator pixels.

17. The method of any one of claims 15, wherein disposing the reflector comprises, along a perimeter of the scintillator array, placing the reflector around an outer side surface of every other scintillator pixel.

18. The method of any one of claims 15, further comprising securing the scintillator array in a housing.

19. The method of claim 15, wherein the reflector is disposed between the scintillator pixels in a zigzag pattern.

20. The method of claim 15, wherein the reflector comprises a diffuse reflective material.

* * * * *